United States Patent
Bleys et al.

(10) Patent No.: US 6,884,824 B2
(45) Date of Patent: *Apr. 26, 2005

(54) PROCESS FOR PREPARING AN ELASTOMER

(75) Inventors: Gerhard Jozef Bleys, Heverlee (BE); Eric Huygens, Heverlee (BE)

(73) Assignee: Huntsman International LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/336,519

(22) Filed: Jan. 3, 2003

(65) Prior Publication Data

US 2003/0162931 A1 Aug. 28, 2003

Related U.S. Application Data

(63) Continuation of application No. PCT/EP01/07137, filed on Jun. 21, 2001.

(30) Foreign Application Priority Data

Jul. 14, 2000 (EP) .............................. 00115290

(51) Int. Cl.[7] .................. C08G 18/48; C08G 18/76; C08J 9/04
(52) U.S. Cl. ................ 521/159; 521/160; 521/174; 521/175; 521/176; 521/914; 528/59; 528/67; 528/76; 528/77
(58) Field of Search ............... 521/159, 160, 521/174, 175, 176, 914; 528/59, 67, 76, 77

(56) References Cited

U.S. PATENT DOCUMENTS

| | | | |
|---|---|---|---|
| 4,202,957 A | 5/1980 | Bonk et al. .................... 528/77 |
| 4,764,540 A | 8/1988 | Dewhurst et al. ............ 521/110 |
| 5,418,260 A | 5/1995 | Smith ........................... 521/159 |
| 5,521,226 A | * 5/1996 | Bleys .......................... 521/174 |
| 5,576,409 A | * 11/1996 | Mackey ....................... 528/49 |
| 5,591,779 A | * 1/1997 | Bleys et al. .............. 521/109.1 |
| 5,670,553 A | * 9/1997 | Mackey ....................... 521/128 |
| 5,670,601 A | 9/1997 | Allen et al. ................... 528/76 |
| 5,728,745 A | 3/1998 | Allen et al. .................. 521/159 |
| 5,773,483 A | * 6/1998 | Eling et al. .................. 521/125 |
| 5,792,829 A | 8/1998 | Allen et al. .................. 528/419 |
| 5,849,944 A | 12/1998 | Allen et al. .................... 560/26 |
| 5,919,395 A | * 7/1999 | Bastin et al. ........... 252/182.24 |
| 5,965,778 A | 10/1999 | Allen et al. .................. 568/620 |
| 5,968,993 A | 10/1999 | Bleys ........................... 521/50 |
| 5,993,528 A | * 11/1999 | Mackey ..................... 106/38.2 |
| 6,068,790 A | * 5/2000 | Postema et al. ....... 252/182.27 |

FOREIGN PATENT DOCUMENTS

| | | |
|---|---|---|
| EP | 220 697 | 5/1987 |
| EP | 294 161 | 12/1988 |
| EP | 656 379 | 6/1995 |
| EP | 656 380 | 6/1995 |
| EP | 656 381 | 6/1995 |
| EP | 751 114 | 1/1997 |
| WO | WO 97/21750 | 6/1997 |
| WO | WO 98/00450 | 1/1998 |
| WO | WO 00/55232 | 9/2000 |

OTHER PUBLICATIONS

G. Woods, "The ICI Polyurethanes Book", 1990, 2nd edition, pp. 32–35.

* cited by examiner

*Primary Examiner*—Rabon Sergent
(74) *Attorney, Agent, or Firm*—Nicole Graham

(57) ABSTRACT

Process for preparing a polyurethane elastomer having an apparent overall density of more than 150 kg/m$^3$ comprising reacting a polyisocyanate and an isocyanate-reactive composition, optionally in the presence of water, wherein the reaction is conducted at an isocyanate index of 85 to 120, the polyisocyanate comprising: a) 80–100% by weight of a diphenylmethane diisocyanate comprising at least 40% by weight of 4,4'-diphenylmethane diisocyanate and/or a derivative of said diphenylmethane diisocyanate which derivative is liquid at 25° C. and has an NCO value of at least 20% by weight, and b) 20–0% by weight of another polyisocyanate, and wherein the isocyanate-reactive composition comprises a) 80–100% by weight of a polyether polyol having an average nominal functionality of 2–8, an average equivalent weight of 750–5000, an average molecular weight of 2000–12000, an oxyethylene content of 60–90% by weight and a primary hydroxyl content of 70–100% calculated on the total number of primary and secondary hydroxyl groups in the polyol, b) an isocyanate-reactive chain extender in an amount such that the hard block ratio is less than 0.50 and c) 20–0% by weight of one or more other isocyanate-reactive compounds excluding water, the amount of polyol a) and isocyanate-reactive compound c) being calculated on the total amount of this polyol a) and compound c).

17 Claims, No Drawings

PROCESS FOR PREPARING AN ELASTOMER

CROSS REFERENCE TO RELATED APPLICATIONS

This application is a continuation of international application PCT EP01/07137, filed Jun. 21, 2001.

FIELD OF THE INVENTION

The present invention is related to a process for preparing a thermosetting elastomer and to the elastomer made according to this process. More specifically, the present invention is related to a process for preparing a thermosetting elastomer using a polyoxyethylene polyoxypropylene polyol having a high oxyethylene content and a polyisocyanate having a high 4,4'-diphenylmethane diisocyanate (4,4'-MDI) content.

BACKGROUND OF THE INVENTION

It is known from the prior art that polyurethane elastomers having short demould time and improved green strength can be prepared using low unsaturation polyoxypropylene polyols having from 1 to about 20 weight percent internal oxyethylene moieties. The elastomers thus prepared exhibit a low water absorption. A further improvement in green strength and demould is possible through the use of polyol blends having multimodal molecular weight distribution coupled with low unsaturation. These same polyols may be used to prepare haze-free polyoxyethylene capped polyols containing 1–20% by weight of random internal and 5–25% by weight of capped oxyethylene groups. The use of low unsaturation polyoxypropylene/polyoxyethylene polyols containing up to about 30 weight percent oxyethylene moieties based on the weight of said polyoxypropylene/polyoxyethylene polyol, at least a portion of which are random, internal oxyethylene moieties, in isocyanate-terminated prepolymers for the preparation of polyurethane elastomers having short demould time and improved green strength is also known in the prior art. Further, the preparation of elastomers from polyols having a high oxyethylene content, from polyisocyanates comprising at least 85% by weight of 4,4'-MDI or a variant thereof and from water has been disclosed in the prior art. The prior art also discloses a RIM process using a prepolymer from uretonimine-modified MDI and a polyether triol having a molecular weight of 400–6000 and an oxyethylene content of 10–85% by weight and using a polyether polyol having 65–100% by weight of oxyethylene units and an aromatic diamine. Short demould times are reported.

Co-pending application WO 00/55232 discloses a process for making a moulded polyurethane material, like an elastomer, by reacting 4,4'-diphenylmethane diisocyanate or a variant thereof, a polyol having a high oxyethylene content and water. Repetitive mouldings can be made without the need to treat the mould for easy demoulding after the first part has been made.

SUMMARY OF THE INVENTION

Surprisingly, it has now been found that if a polyol is used that has a high oxyethylene content and a high level of primary hydroxyl groups such easy demoulding is obtained as well. Further, the elastomers prepared according to the process according to the present invention can be formulated with relatively low amounts of catalyst and still be demoulded relatively fast.

Therefore, the present invention is concerned with a process for preparing a polyurethane thermosetting elastomer having an apparent overall density of more than 150 kg/m$^3$ comprising reacting a polyisocyanate and an isocyanate-reactive composition, optionally in the presence of water, wherein the reaction is conducted at an isocyanate index of 85 to 120, the polyisocyanate consists of a) 80–100% by weight of diphenylmethane diisocyanate comprising at least 40%, preferably at least 60% and most preferably at least 85% by weight of 4,4'-diphenylmethane diisocyanate and/or a variant of said diphenylmethane diisocyanate which variant is liquid at 25° C. and has an NCO value of at least 20% by weight (polyisocyanate a), and b) 20–0% by weight of another polyisocyanate (polyisocyanate b), and wherein the isocyanate-reactive composition consists of a) 80–100% by weight of a polyether polyol having an average nominal functionality of 2–8, an average equivalent weight of 750–5000, an average molecular weight of 2000–12000, an oxyethylene (EO) content of 60–90% by weight and a primary hydroxyl content of 70–100% calculated on the total number of primary and secondary hydroxyl groups in the polyol, b) an isocyanate-reactive chain extender in an amount such that the hard block ratio is less than 0.50 and preferably less than 0.45, and c) 20–0% by weight of one or more other isocyanate-reactive compounds excluding water, the amount of polyol a) and isocyanate-reactive compound c) being calculated on the total amount of this polyol a) and compound c).

DETAILED DESCRIPTION OF THE INVENTION

The present invention is concerned with a process for preparing a polyurethane thermosetting elastomer having an apparent overall density of more than 150 kg/m$^3$ comprising reacting a polyisocyanate and an isocyanate-reactive composition, optionally in the presence of water, wherein the reaction is conducted at an isocyanate index of 85 to 120, the polyisocyanate consists of a) 80–100% by weight of diphenylmethane diisocyanate comprising at least 40%, preferably at least 60% and most preferably at least 85% by weight of 4,4'-diphenylmethane diisocyanate and/or a variant of said diphenylmethane diisocyanate which variant is liquid at 25° C. and has an NCO value of at least 20% by weight (polyisocyanate a), and b) 20–0% by weight of another polyisocyanate (polyisocyanate b), and wherein the isocyanate-reactive composition consists of a) 80–100% by weight of a polyether polyol having an average nominal functionality of 2–8, an average equivalent weight of 750–5000, an average molecular weight of 2000–12000, an oxyethylene (EO) content of 60–90% by weight and a primary hydroxyl content of 70–100% calculated on the total number of primary and secondary hydroxyl groups in the polyol, b) an isocyanate-reactive chain extender in an amount such that the hard block ratio is less than 0.50 and preferably less than 0.45, and c) 20–0% by weight of one or more other isocyanate-reactive compounds excluding water, the amount of polyol a) and isocyanate-reactive compound c) being calculated on the total amount of this polyol a) and compound c).

These elastomers can be easily demoulded, even without the use of internal mould release agents and without the repetitive use of external mould release agents after the first part has been made, as described in co-pending application WO 00/55232. The elastomers prepared according to the present invention have a glass transition temperature, Tg, below 25° C. Preferably, the elastomers have a ratio of the storage modulus (E') at 20° C. and the storage modulus (E')

at 120° C. of between 0.75 and 1.5, a tan δ at 100° C. of less than 0.1 and a maximum value of the tan δ of more than 0.8, the tan δ being the ratio of the loss modulus (E") and the storage modulus (E'). Preferably, the maximum value of the tan δ is more than 1.0. The ratio of the storage modulus (E') at 20° C. and the storage modulus (E') at 120° C. is preferably between 0.8 and 1.2, and most preferably between 0.85 and 1.00. It is preferred to have a tan δ at 100° C. of less than 0.05. Most preferably, the tan δ at 100° C. is less than 0.03. The prime maximum of the tan δ preferably occurs at a temperature below 0° C., most preferably below −10° C. The storage and loss modulus are measured by Dynamic Mechanical Thermal Analysis (DMTA measured according to ISO/DIS 6721-5). Still further, the elastomers have good humid aged properties, good creep, smell, fogging and fire properties. Further, such elastomers can be prepared with a relatively low amount of catalyst. Because the elastomers according to the present invention can be demoulded with a reduced amount of external mould release agent, the elastomers can be more easily painted.

In the context of the present invention the following terms have the following meaning:

1) isocyanate index or NCO index or index:

the ratio of NCO-groups over isocyanate-reactive hydrogen atoms present in a formulation, given as a percentage:

$$\frac{[NCO] \times 100}{[\text{active hydrogen}]} (\%).$$

In other words, the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual polymerization process preparing the elastomer involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of the water) present at the actual polymerization stage are taken into account.

2) The expression "isocyanate-reactive hydrogen atoms" as used herein for the purpose of calculating the isocyanate index refers to the total of active hydrogen atoms in hydroxyl and amine groups present in the reactive compositions. This means that for the purpose of calculating the isocyanate index at the actual polymerization process one hydroxyl group is considered to comprise one reactive hydrogen, one primary amine group is considered to comprise one reactive hydrogen and one water molecule is considered to comprise two active hydrogens.

3) Reaction system: a combination of components wherein the polyisocyanates are kept in one or more containers separate from the isocyanate-reactive components.

4) The expression "polyurethane material or elastomer" as used herein refers to cellular or non-cellular products as obtained by reacting polyisocyanates with isocyanate-reactive hydrogen containing compounds, optionally using foaming agents, and in particular includes cellular products obtained with water as reactive foaming agent (involving a reaction of water with isocyanate groups yielding urea linkages and carbon dioxide and producing polyurea-urethane foams) and with polyols, aminoalcohols and/or polyamines as isocyanate-reactive compounds.

5) The term "average nominal hydroxyl functionality" is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

6) The word "average" refers to number average unless indicated otherwise.

7) The term "hard block ratio" refers to the amount (in pbw) of polyisocyanate+isocyanate-reactive materials having a molecular weight of at most 1000 (wherein polyols having a molecular weight of more than 1000 incorporated in polyisocyanate prepolymers are not taken into account) divided by the amount (in pbw) of all polyisocyanate+all isocyanate-reactive materials used.

Preferably, the polyisocyanate a) is selected from 1) a diphenylmethane diisocyanate comprising at least 40%, preferably at least 60% and most preferably at least 85% by weight of 4,4'-diphenylmethane diisocyanate and the following preferred variants of such diphenylmethane diisocyanate: 2) a carbodiimide and/or uretonimine modified variant of polyisocyanate 1), the variant having an NCO value of 20% by weight or more; 3) a urethane modified variant of polyisocyanate 1), the variant having an NCO value of 20% by weight or more and being the reaction product of an excess of polyisocyanate 1) and of a polyol having an average nominal hydroxyl functionality of 2–4 and an average molecular weight of at most 1000; 4) a prepolymer having an NCO value of 20% by weight or more and which is the reaction product of an excess of any of the aforementioned polyisocyanates 1–3) and of a polyol having an average nominal functionality of 2–6, an average molecular weight of 2000–12000 and preferably an hydroxyl value of 15 to 60 mg KOH/g, and 5) mixtures of any of the aforementioned polyisocyanates.

Polyisocyanate 1) comprises at least 40% by weight of 4,4'-MDI. Such polyisocyanates are known in the art and include pure 4,4'-MDI and isomeric mixtures of 4,4'-MDI and up to 60% by weight of 2,4'-MDI and 2,2'-MDI. It is to be noted that the amount of 2,2'-MDI in the isomeric mixtures is rather at an impurity level and in general will not exceed 2% by weight, the remainder being 2,4'-MDI and 4,4'-MDI. Polyisocyanates as these are known in the art and commercially available, for example as e.g. SUPRASEC™ MPR isocyanate (Huntsman International LLC). The carbodiimide and/or uretonimine modified variants of the above polyisocyanate 1) are also known in the art and commercially available as e.g. SUPRASEC 2020 isocyanate (Huntsman International LLC). Urethane modified variants of the above polyisocyanate 1) are also known in the art, see e.g. The ICI Polyurethanes Book by G. Woods 1990, $2^{nd}$ edition, pages 32–35.

Aforementioned prepolymers of polyisocyanate 1) having an NCO value of 20% by weight or more are also known in the art. Preferably, the polyol used for making these prepolymers is selected from polyester polyols and polyether polyols and especially from polyoxyethylene polyoxypropylene polyols having an average nominal functionality of 2–4, an average molecular weight of 2500–8000, and preferably an hydroxyl value of 15–60 mg KOH/g and preferably either an oxyethylene content of 5–25% by weight, which oxyethylene preferably is at the end of the polymer chains, or an oxyethylene content of 50–90% by weight, which oxyethylene preferably is randomly distributed over the polymer chains.

Mixtures of the aforementioned polyisocyanates may be used as well. An example of such a commercially available polyisocyanate is SUPRASEC 2021 isocyanate (Huntsman International LLC).

The other polyisocyanate b) may be chosen from aliphatic, cycloaliphatic, araliphatic and, preferably, aromatic polyisocyanates, such as toluene diisocyanate in the form of its 2,4 and 2,6-isomers and mixtures thereof and mixtures of diphenylmethane diisocyanates (MDI) and oligomers thereof having an isocyanate functionality greater than 2 known in the art as "crude" or polymeric MDI (polymethylene polyphenylene polyisocyanates). Mixtures of toluene diisocyanate and polymethylene polyphenylene polyisocyanates may be used as well.

If prepolymers, having an NCO value of 20% by weight or more made from polyols having a molecular weight of 2000–12000, are used, the amount of these polyols in the prepolymers compared to the total amount of these polyols used in making the elastomer is preferably less than 50% and more preferably less than 30% by weight.

Polyol 1) having a high EO content and a high primary hydroxyl content are selected from those having an EO content of 60–90% by weight and preferably of 65–85% by weight calculated on the weight of the polyether polyol and a primary hydroxyl content of 70–100% and preferably of 80–100% calculated on the total number of primary and secondary hydroxyl groups in the polyol. These polyether polyols contain other oxyalkylene groups like oxypropylene and/or oxybutylene groups; preferably, these polyether polyols are polyoxyethylene polyoxypropylene polyols. These polyols have an average nominal functionality of 2–8 and more preferably of 2–4, an average equivalent weight of 750–5000 and preferably of 1000–4000 and a molecular weight of 2000–12000, preferably of 2000–10000 and more preferably of 2500–8000. As long as there are sufficient oxyethylene groups at the end of the polymer chains so as to meet the requirement of the primary hydroxyl content the distribution of the oxyethylene and other oxyalkylene groups over the polymer chains may be of the type of a random distribution, a block copolymer distribution or a combination thereof. Mixtures of polyols may be used. Methods to prepare such polyols are known, and such polyols are commercially available; examples are CARADOL™ 3602 polyol from Shell and LUPRANOL™ 9205 polyol from BASF.

The isocyanate-reactive chain extenders may be selected from amines, amino-alcohols and polyols; preferably polyols are used. Further, the chain extenders may be aromatic, cycloaliphatic, araliphatic and aliphatic; preferably, aliphatic ones are used. The chain extenders have a molecular weight of less than 2000 and preferably of 62–1000. Most preferred are aliphatic diols having a molecular weight of 62–1000, such as ethylene glycol, 1,3-propanediol, 2-methyl-1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methylpentane-1,5-diol, 2,2-dimethyl-1,3-propanediol, diethylene glycol, dipropylene glycol and tripropylene glycol, and propoxylated and/or ethoxylated products thereof. The amount of chain extenders used is such that the hard block ratio is less than 0.50, and preferably less than 0.45.

The other isocyanate-reactive compounds, which may be used in an amount of up to 20% by weight and preferably of up to 10% by weight, may be selected from polyether polyamines, polyester polyols and polyether polyols (different from the above described ones) having a molecular weight of 2000 or more and in particular from such other polyether polyols, which may be selected from polyoxyethylene polyols, polyoxypropylene polyols, polyoxyethylene polyoxypropylene polyols having an oxyethylene content of less than 60% or more than 90% by weight and polyoxyethylene polyoxypropylene polyols having a primary hydroxyl content of less than 70%. Preferred polyoxyethylene polyoxypropylene polyols are those having an oxyethylene content of 5–30% and preferably 10–25% by weight, wherein all the oxyethylene groups are at the end of the polymer chains (so-called EO-capped polyols) and those having an oxyethylene content of 60–90% by weight and having all oxyethylene groups and oxypropylene groups randomly distributed and a primary hydroxyl content of 20–60%, calculated on the total number of primary and secondary hydroxyl groups in the polyol. Preferably, these other polyether polyols have an average nominal functionality of 2–6, more preferably 2–4 and an average molecular weight of 2000–10000, more preferably of 2500–8000. Further, the other isocyanate-reactive compounds may be selected from cross-linkers, which are isocyanate-reactive compounds having an average molecular weight below 2000, preferably up to 1000 and a functionality of 3–8. Examples of such cross-linkers are glycerol, trimethylolpropane, pentaerythritol, sucrose, sorbitol, mono-, di- and triethanolamine, ethylenediamine, toluenediamine, diethyltoluene diamine, polyoxyethylene polyols having an average nominal functionality of 3–8 and an average molecular weight of less than 2000 like ethoxylated glycerol, trimethylol propane, pentaerythritol, sucrose and sorbitol having said molecular weight, and polyether diamines and triamines having an average molecular weight below 2000; most preferred cross-linkers are the polyol cross-linkers.

Still further, the other isocyanate-reactive compounds may be selected from polyesters, polyesteramides, polythioethers, polycarbonates, polyacetals, polyolefins or polysiloxanes. Polyester polyols which may be used include hydroxyl-terminated reaction products of dihydric alcohols such as ethylene glycol, propylene glycol, diethylene glycol, 1,4-butanediol, neopentyl glycol, 1,6-hexanediol or cyclohexane dimethanol or mixtures of such dihydric alcohols, and dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesteramides may be obtained by the inclusion of aminoalcohols such as ethanolamine in polyesterification mixtures.

Polythioether polyols, which may be used, include products obtained by condensing thiodiglycol either alone or with other glycols, alkylene oxides, dicarboxylic acids, formaldehyde, amino-alcohols or aminocarboxylic acids. Polycarbonate polyols that may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene. Polyacetal polyols that may be used include those prepared by reacting glycols such as diethylene glycol, triethylene glycol or hexanediol with formaldehyde. Suitable polyacetals may also be prepared by polymerizing cyclic acetals. Suitable polyolefin polyols include hydroxy-terminated butadiene homo- and copolymers and suitable polysiloxane polyols include polydimethylsiloxane diols.

Mixtures of the aforementioned other isocyanate-reactive compounds may be used as well. Preferably, the other isocyanate-reactive compounds are polyols selected from the above preferred ones.

The polyols may comprise dispersions or solutions of addition or condensation polymers in polyols of the types described above. Such modified polyols, often referred to as "polymer polyols", have been fully described in the prior art and include products obtained by the in situ polymerization of one or more vinyl monomers, for example styrene and/or acrylonitrile, in the above polyether polyols, or by the in situ reaction between a polyisocyanate and an amino- and/or hydroxy-functional compound, such as triethanolamine, in the above polyol. Polyoxyalkylene polyols containing from 1 to 50% of dispersed polymer are particularly useful. Particle sizes of the dispersed polymer of less than 50 microns are preferred.

During the last years, several methods have been described to prepare polyether polyols having a low level of unsaturation. These developments have made it possible to use polyether polyols at the higher end of the molecular weight range because such polyols can now be prepared with an acceptably low level of unsaturation. According to the present invention polyols having a low level of unsaturation may be used as well. In particular, such high molecular weight polyols having a low level of unsaturation may be used.

Still further, the following optional ingredients may be used: catalysts enhancing the formation of urethane bonds like tin catalysts like tin octoate and dibutyltindilaurate, tertiary amine catalysts like triethylenediamine and imidazoles like dimethylimidazole and other catalysts like maleate esters and acetate esters; surfactants; foam stabilisers like siloxane-oxyalkylene copolymers; fire retardants; smoke suppressants; UV-stabilizers; colorants; microbial inhibitors; organic and inorganic fillers; internal mould release agents (such agents may be used to further enhance the release of the materials made but are not essential) and external mould release agents, preferably used only before parts are made as explained below.

A class of catalyst that may be used is an alkali metal or alkaline earth metal carboxylate salt. The catalyst may be a salt of any metal of Groups IA and IIA of the Periodic Table but in general the alkali metal salts are preferred like potassium and sodium salts, especially the potassium salts. If desired mixtures of such salts may be used like a mixture of a potassium and a sodium salt. A catalytically effective amount of the salt will usually be in the range of 0.1 to 10, preferably 0.2–5 parts by weight per 100 parts by weight of reactants. The carboxylate may be selected from aliphatic carboxylates having 2–10 carbon atoms like acetate, hexanoate, 2-ethylhexanoate and octanoate. Especially, the carboxylate may be selected from those having the formula:

R-E-A-COO—, wherein

A is a hydrocarbon diradical having 1–6 preferably 1–3 carbon atoms; E is —O— or

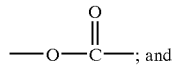
; and

R is X—$R_1$—$(OR_2)_n$— wherein X is $CH_3$— or OH—, R1 is a hydrocarbon diradical having 1–8 and preferably 1–4 carbon atoms, R2 is a hydrocarbon diradical having 2–4 and preferably 2 or 3 carbon atoms and n is 0 to 10, preferably 0–5.

A may be selected from diradicals like —$CH_2$—, —$CH_2CH_2$—, —$CH_2CH_2CH_2$—, —CH=CH—$CH_2$—, —$CH_2$—CH—$CH_3$, —CH=CH—, —CH=C—$CH_3$ and $CH_2$=C—$CH_2$—. The most preferred diradical is —CH=CH— or —$CH_2$—C=$CH_2$.

$R_1$ may be selected from those diradicals mentioned for A and from radicals obtained by removing two hydrogen atoms from e.g. butane, pentane, hexane and octane. The most preferred radicals for $R_1$ are methylene, ethylene, trimethylene, tetramethylene and propylene.

$R_2$ may be selected from ethylene, trimethylene, tetramethylene, ethylethylene and propylene. Most preferred groups are ethylene and propylene.

Such catalysts and their preparation are known; e.g. EP 294161, EP 220697 and EP 751114. Examples of catalysts are sodium acetate, potassium acetate, potassium hexanoate, potassium 2-ethylhexanoate, potassium ethoxyacetate, sodium ethoxyacetate, the potassium salt of the hemi-ester of maleic acid and ethoxyethane, ethoxyethoxyethane, ethylene glycol, diethylene glycol, triethylene glycol, tetraethylene glycol, propylene glycol, dipropylene glycol, tripropylene glycol, methanol, ethanol, propanol or butanol and the potassium salt of the hemi-ester of such hydroxy containing compounds with malonic, succinic, glutaric, adipic or fumaric acid. Mixtures of these catalysts may be used as well.

The elastomer may be a solid or blown (microcellular) elastomer. Microcellular elastomers are obtained by conducting the reaction in the presence of a blowing agent, like hydrocarbons, hydrofluorocarbons, hydrochlorofluorocarbons, gases like $N_2$ and $CO_2$, and water. Most preferably, water is used as the blowing agent. The amount of blowing agent will depend on the desired density. The amount of water will be less than 1.5 and preferably less than 0.8% by weight; calculated on the amount of all other ingredients used.

The reaction to prepare the foams is conducted at an NCO index of 85–120 and preferably of 90–110 and most preferably of 90–105. The density of the elastomers is higher than 150 kg/m$^3$, preferably higher than 250 kg/m$^3$, and preferably higher than 400 kg/m$^3$.

The elastomers are preferably made in a mould. The process may be conducted in any type of mould known in the art. Examples of such moulds are the moulds commercially used for making polyurethane shoe soles, automotive parts, like steering wheels, arm-rests, covers for dash-boards and door panels, and head-rests. Preferably, the reaction is conducted in a closed mould. The moulds preferably are metal, e.g. aluminium or steel, or epoxy resin moulds.

The ingredients used for making the foam are fed into the mould at a temperature of from ambient temperature up to 80° C. and preferably up to 70° C., the mould being kept at a temperature of from ambient temperature up to 80° C. and preferably up to 70° C. during the process. Demoulding time is relatively short despite the fact that preferably no isocyanate-reactive compounds, containing amine groups, are used; depending on the amount of catalyst and process conditions demould times may be below 10 minutes, preferably below 5 minutes, more preferably below 3 minutes, and most preferably below 1 minute. The moulding process may be conducted according to the reaction injection moulding (RIM) process and the cast moulding process. In general, the isocyanate-reactive ingredients are pre-mixed, optionally together with the optional ingredients, before being brought into contact with the polyisocyanate.

The elastomers according to the invention are particularly suitable for use in applications where good energyabsorbing and fatigue properties are required and a good elastomeric behaviour over a broad temperature range, e.g. in the automotive and footwear industry. The elastomers can be used as in-soles, mid-soles and out-soles of shoes and boots and in steering wheels, sound insulation mats, air-filter seals and dashboard-skins.

Because the elastomers according to the present invention can be easily demoulded without applying external mould release after the first part has been made, the present invention is further concerned with a process for preparing a polyurethane elastomer having an apparent overall density of more than 150 kg/m$^3$ in a mould in which process the following steps are conducted:

1. an external mould release agent is applied onto at least those surfaces of the mould which will be in contact with the ingredients used for preparing the elastomer and/or the finished elastomer;
2. the ingredients to be used for preparing the elastomer are fed into the mould;
3. the ingredients are allowed to react and to form the polyurethane material which comprises reacting a polyisocyanate and an isocyanate-reactive composition, optionally in the presence of water, wherein the reaction is conducted at an isocyanate index of 40 to 120, the polyisocyanate consists of a) 80–100% by weight of diphenylmethane diisocyanate comprising at least 40%, preferably at least 60% and most preferably at least 85% by weight of 4,4'-diphenylmethane diisocyanate and/or a variant of said diphenylmethane diisocyanate which variant is liquid at 25° C. and has an NCO value of at least 20% by weight (polyisocyanate a), and b) 20–0% by weight of another polyisocyanate (polyisocyanate b), and wherein the isocyanate-reactive composition consists of a) 80–100% by weight of a polyether polyol having an average nominal functionality of 2–8, an average equivalent weight of 750–5000, an average molecular weight of 2000–12000, an oxyethylene (EO) content of 60–90% by weight and a primary hydroxyl content of 70–100% calculated on the number of primary and secondary hydroxyl groups in the polyol, b) an isocyanate-reactive chain extender in an amount such that the hard block ratio is less than 0.50 and preferably less than 0.45, and c) 20–0% by weight of one or more other isocyanate-reactive compounds excluding water, the amount of polyol a) and isocyanate-reactive compound c) being calculated on the total amount of this polyol a) and compound c);
4. the polyurethane material so formed is removed from the mould; and
5. steps 2,3 and 4 are repeated at least 10 times without repeating step 1.

The materials obtained have comparable physical properties irrespective of whether the material is obtained after steps 2,3 and 4 have been conducted once, 10 times, 25 times, 40 times or even more.

The moulding process may be conducted in an open mould and in a closed mould; preferably, the reaction takes place in a closed mould. When the moulding process is conducted in a closed mould, the mould may be closed after step 2, and opened after step 3 or the mould may be closed after step 1 and opened after step 3; in the latter case, the ingredients for making the elastomer are fed into the mould via appropriate inlets. The moulding may be conducted by processes known in the art, such as cast moulding and reaction injection moulding (RIM). As said, step 2–4 are repeated at least 10 times without repeating step 1; preferably this is at least 15 times and most preferably at least 25 times. Although, it would be desirable that steps 2–4 could be repeated as many times as possible without repeating step 1, practice has shown that it may be desirable to repeat step 1, after steps 2–4 have been repeated a considerable number of times without repeating step 1. In general it can be said that step 1 is to be repeated when a substantial increase of the force needed to remove a moulded part is observed, compared to the force needed to remove the first moulded part, to such an extent that it is to be expected that the next demoulding can not be made without damaging the part. Those involved in demoulding on commercial production lines will be able to easily determine if and when step 1 is to be repeated. Although not yet needed because of deteriorating demoulding performance, it might nevertheless be desirable to repeat step 1 after a certain time period, in order to have a consistent production process. In that context, it might be desirable to repeat step 1 e.g. every hour or between two shifts (of e.g. 8 hours), after 24 hours or after a week depending on the complexity of the mould. It is to be noted that a usual cycle time generally is between 0.5 and 20 minutes and often between 1 and 10 minutes.

The process may be conducted in any type of mould known in the art. Examples of such moulds are the moulds commercially used for making polyurethane shoe soles, automotive parts, like steering wheels, arm-rests, head-rests and covers for dash-boards and door panels. The material of the mould may be selected form those known in the art like metal, e.g. steel, aluminium, and epoxy resin.

Step 1 of the process according to the invention may be conducted in any way known in the art. Applying an external mould release agent on the surfaces of a mould, which surfaces will be in contact with the ingredients used for making the material and/or with the material includes any way of applying such an agent to the surfaces, like rubbing, brushing, spraying and combinations thereof and applying any agent or agents intended to facilitate the later demoulding. One or more external mould release agents may be used or mixtures of external release agents. The external mould release agents may be applied as such or as a solution, emulsion or dispersion in a liquid. The external mould release agents, applied in step 1, may be applied in one or more stages. Any external mould release agent known in the art may be applied; examples of suitable external mould release agents are KLUBERPUR 41-0039 and 41-0061 agent (both from Kluber Chemie), DESMOTROL D-10RT agent (from Productos Concentrol SA), ACMOSIL 180 STBH agent (from Fuller and Johnson), CIRE 103 agent (from Johnson and Johnson).

The present invention is illustrated by the following examples.

EXAMPLES

Example 1

100 parts by weight (pbw) of CARADOL™ SA 3602 polyol, ex Shell (a polyol having a nominal hydroxyl functionality of 3, an OH-value of 36 mg KOH/g, an oxyethylene content of about 77% by weight and a primary hydroxy content of about 90%), 4.34 pbw of ethylene glycol, 0.50 pbw of water, 0.75 pbw of DABCO EG (an amine catalyst from AirProducts) were mixed. To this was added 39.8 pbw of SUPRASEC 2020 isocyanate (a uretonimine-modified MDI from a polyisocyanate comprising more than 95% w 4,4'-MDI having an NCO value of 29.5% by weight ex Huntsman Polyurethanes. After thorough mixing (Heydolph bench mixer, about 4500 rounds per minute for 10–15 seconds), 105 g of this formulation was poured in an aluminium mould (20×15×1.5 cm) and allowed to react (the mould lid was closed). After 8 minutes the elastomer obtained was easily demoulded. The mould temperature was 50° C. and before the formulation was poured in the mould, the inner walls of the mould were rubbed with a sponge containing a solid wax LH-1 from Chem Trend and then sprayed with soap spray ES-940/M ex Muench. After the first elastomer was demoulded, 12 other elastomers could be easily demoulded following the above process but without treatment of the inner walls of the mould. After 13 mouldings the experiment was voluntarily stopped.

Example 2

90 pbw of CARADOL SA 3602 polyol was mixed with 10 pbw of 1,4-butanediol, 1.5 pbw of DABCO 25S catalyst (amine catalyst ex Air Products) and 0.1 pbw of DABCO 120 catalyst (tin-mercaptide catalyst ex Air Products). 100 pbw of this polyol formulation (temperature 30° C.) and 50 pbw of a polyisocyanate having an NCO value of 26.2% by weight and which is a mixture of 1) a polyisocyanate made by reacting 42.55 pbw of MDI comprising more than 95% by weight of 4,4'-MDI and 5.05 pbw of a mixture of tripropylene glycol, propylene glycol and 1,3-butanediol (59/18.79/22.21,/w/w/w) and of 2) Surprasec 2020 (52.4 pbw) were reaction-injection moulded (RIM) using a KM Comet 20/20; the mould was a plaque tool of 60×30×0.4 cm; the output was 450 g/s; mould temperature was 65° C.; the inner walls of the mould were treated once with wax 36-3534 ex Acmos before the ingredients were injected into the mould. The elastomer had a density of 1230 kg/m$^3$. Without further treatment of the inner walls of the mould, 24 other elastomeric parts made in the same way and having similar properties could be obtained with easy demoulding with a minimum demould time of 15 seconds. The experiment was voluntarily stopped. The elastomers had the following properties:

| | |
|---|---|
| Apparent overall density (DIN 53420), kg/m$^3$ | 1231 |
| Hardness Shore A (DIN 53505) | 58 |
| Abrasion, mg loss, 20 m (DIN 53516) | 196 |
| Tensile strength (DIN 53504), MPa | 3.3 |
| Elongation (DIN 53504), % | 161 |
| Hyd Tensile (DIN 53504)*, MPa | 4 |
| Hyd Elongation (DIN 53504)*, % | 202 |
| Angle Tear (DIN 53515), N/mm | 21 |

*same test as above but after humid ageing (7 days at 70° C. at 100% humidity followed by 1 day at 70° C. at ambient humidity).

The above experiment was repeated with the following differences. The amount of polyisocyanate was changed and the CARADOL SA 3602 polyol was replaced as follows; the results are indicated as well:

| experiment (comparative) | 2 | 3 |
|---|---|---|
| Polyisocyanate, pbw | 52 | 52.7 |
| Polyol 1, pbw | 30 | 60 |
| Polyol 2, pbw | 60 | 30 |
| Minimum demould time, seconds | 60 | 60 |
| Number of undamaged releases | 4 | 5 |

Polyol 1: is a glycerol initiated polyoxyethylene polyoxypropylene polyol having a molecular weight of 4000, an EO content of 75% by weight (all random) and a primary OH content of 42%.
Polyol 2: is a dipropylene glycol initiated polyoxyethylene polyoxypropylene polyol comprising about 27% by weight EO (all capped) and having a molecular weight of about 3750.

What is claimed:

1. A process for preparing a polyurethane thermosetting elastomer having an apparent overall density of more than 150 kg/m$^3$ comprising reacting a polyisocyanate and an isocyanate-reactive composition, optionally in the presence of water, wherein the reaction is conducted at an isocyanate index of 85 to 120, the polyisocyanate comprising:

a) 80–100% by weight of 1) a diphenylmethane diisocyanate comprising at least 40% by weight of 4,4'-diphenylmethane diisocyanate and/or 2) a variant of said diphenylmethane diisocyanate 1) which variant is liquid at 25° C. and has an NCO value of at least 20% by weight, and b) 20–0% by weight of another polyisocyanate, wherein the isocyanate-reactive composition comprises: i) 80–100% by weight of a polyether polyol having an average nominal functionality of 2–8, an average equivalent weight of 750–5000, an average molecular weight of 2000–12000, an oxyethylene content of 60–90% by weight calculated on the weight of the polyether polyol and a primary hydroxyl content of 70–100% calculated on the total number of primary and secondary hydroxyl groups in the polyol, ii) an isocyanate-reactive chain extender in an amount such that the hard block ratio is less than 0.50 and iii) 20–0% by weight of one or more other isocyanate-reactive compounds excluding water, the amount of polyol i) and isocyanate-reactive compound iii) being calculated on the total amount of this polyol i) and compound iii).

2. The process of claim 1, wherein the hard block ratio is less than 0.45, the oxyethylene content of the polyether polyol is 65–85% by weight calculated on the weight of the polyether polyol, the average nominal functionality is 2–4, the average equivalent weight is 1000–4000 and the average molecular weight is 2000–10000 and the polyisocyanate comprises 80–100% by weight of diphenylmethane diisocyanate comprising at least 85% by weight of 4,4'-diphenylmethane diisocyanate and/or a variant of said diphenylmethane diisocyanate.

3. A process for preparing a polyurethane thermosetting elastomer having an apparent overall density of more than 150 kg/m$^3$ in a mould comprising the steps of:

(a) applying an external mould release agent onto at least those surfaces of the mould that will be in contact with ingredients used for preparing the elastomer;

(b) feeding the ingredients to be used for preparing the elastomer into the mould, wherein the ingredients comprise:

a polyisocyanate and an isocyanate-reactive composition, optionally in the presence of water, wherein the reaction is conducted at an isocyanate index of 85 to 120, the polyisocyanate comprising:
(i) 80–100% by weight of 1) a diphenylmethane diisocyanate comprising at least 40% by weight of 4,4'-diphenylmethane diisocyanate and/or 2) a variant of said diphenylmethane diisocyanate 1), which variant is liquid at 25° C. and has an NCO value of at least 20% by weight, and
(ii) 20–0% by weight of another polyisocyanate,
and the isocyanate-reactive composition comprises: A) 80–100% by weight of a polyether polyol having an average nominal functionality of 2–8, an average equivalent weight of 750–5000, an average molecular weight of 2000–12000, an oxyethylene content of 60–90% by weight calculated on the weight of the polyether polyol and a primary hydroxyl content of 70–100% calculated on the total number of primary and secondary hydroxyl groups in the polyol, B) an isocyanate-reactive chain extender in an amount such that the hard block ratio is less than 0.50 and C) 20–0% by weight of one or more other isocyanate-reactive compounds excluding water, the amount of polyol A) and isocyanate-reactive compound C) being calculated on the total amount of this polyol A) and compound C).

(c) allowing the ingredients to react to form the elastomer;

(d) removing the elastomer from the mould; and (e) repeating step (b), (c), and (d) at least 10 times without repeating step (a).

4. The process of claim 3, wherein steps (b), (c), and (d) are repeated at least 25 times without repeating step (a).

5. The process of claim 3, wherein step (a) is repeated after one week.

6. The process of claim 3, wherein step (a) is repeated after 24 hours.

7. The process of claim 3, wherein step (a) is repeated after 8 hours.

8. The process of claim 3, wherein the mould is a closed mould.

9. The process of claim 3, wherein the mould is a metal or epoxy resin mould.

10. A thermosetting elastomer comprising the reaction product of a polyisocyanate and an isocyanate-reactive composition, optionally in the presence of water, wherein the reaction is conducted at an isocyanate index of 85 to 120, the polyisocyanate comprising:

a) 80–100% by weight of 1) a diphenylmethane diisocyanate comprising at least 40% by weight of 4,4'-diphenylmethane diisocyanate and/or 2) a variant of said diphenylmethane diisocyanate 1) which variant is liquid at 25° C. and has an NCO value of at least 20% by weight, and b) 20–0% by weight of another polyisocyanate, wherein the isocyanate-reactive composition comprises: i) 80–100% by weight of a polyether polyol having an average nominal functionality of 2–8, an average equivalent weight of 750–5000, an average molecular weight of 2000–12000, an oxyethylene content of 60–90% by weight calculated on the weight of the polyether polyol and a primary hydroxyl content of 70–100% calculated on the total number of primary and secondary hydroxyl groups in the polyol, ii) an isocyanate-reactive chain extender in an amount such that the hard block ratio is less than 0.50 and iii) 20–0% by weight of one or more other isocyanate-reactive compounds excluding water, the amount of polyol i) and isocyanate-reactive compound iii) being calculated on the total amount of this polyol i) and compound iii).

11. The thermosetting elastomer of claim 10, wherein the hard block ratio is less than 0.45, the oxyethylene content of the polyether polyol is 65–85% by weight calculated on the weight of the polyether polyol, the average nominal functionality is 2–4, the average equivalent weight is 1000–4000 and the average molecular weight is 2000–10000 and the polyisocyanate comprises 80–100% by weight of diphenylmethane diisocyanate comprising at least 85% by weight of 4,4'-diphenylmethane diisocyanate and/or a variant of said diphenylmethane diisocyanate.

12. A thermosetting elastomer having an apparent overall density of more than 150 kg/m$^3$ made in a mould according to a process comprising the steps of:

(a) applying an external mould release agent onto at least those surfaces of the mould that will be in contact with ingredients used for preparing the elastomer;

(b) feeding the ingredients to be used for preparing the elastomer into the mould, wherein the ingredients comprise:

a polyisocyanate and an isocyanate-reactive composition, optionally in the presence of water, wherein the reaction is conducted at an isocyanate index of 85 to 120, the polyisocyanate comprising:

(i) 80–100% by weight of 1) a diphenylmethane diisocyanate comprising at least 40% by weight of 4,4'-diphenylmethane diisocyanate and/or 2) a variant of said diphenylmethane diisocyanate 1), which variant is liquid at 25° C. and has an NCO value of at least 20% by weight, and (ii) 20–0% by weight of another polyisocyanate, and the isocyanate-reactive composition comprises: A) 80–100% by weight of a polyether polyol having an average nominal functionality of 2–8, an average equivalent weight of 750–5000, an average molecular weight of 2000–12000, an oxyethylene content of 60–90% by weight of the polyether polyol and a primary hydroxyl content of 70–100% calculated on the total number of primary and secondary hydroxyl groups in the polyol, B) an isocyanate-reactive chain extender in an amount such that the hard block ratio is less than 0.50 and C) 20–0% by weight of one or more other isocyanate-reactive compounds excluding water, the amount of polyol A) and isocyanate-reactive compound C) being calculated on the total amount of this polyol A) and compound C).

(c) allowing the ingredients to react to form the elastomer;

(d) removing the elastomer from the mould; and repeating step (b), (c), and (d) at least 10 times without repeating step (a).

13. The thermosetting elastomer of claim 12, wherein steps (b), (c), and (d) are repeated at least 25 times without repeating step (a).

14. The thermosetting elastomer of claim 12, wherein step (a) is repeated after one week.

15. The thermosetting elastomer of claim 12, wherein step (a) is repeated after 24 hours.

16. The thermosetting elastomer of claim 12, wherein the mould is a closed mould.

17. The thermosetting elastomer of claim 12, wherein the mould is a metal or epoxy resin mould.

* * * * *